A. E. & J. W. BLAIR.
VEHICLE SUPPORT.
APPLICATION FILED NOV. 1, 1912.

1,068,964.

Patented July 29, 1913.

2 SHEETS—SHEET 1.

Witnesses:

Inventor,
Athol E. Blair.
John W. Blair.
By Victor J. Evans,
Attorney.

A. E. & J. W. BLAIR.
VEHICLE SUPPORT.
APPLICATION FILED NOV. 1, 1912.
1,068,964.
Patented July 29, 1913.
2 SHEETS—SHEET 2.
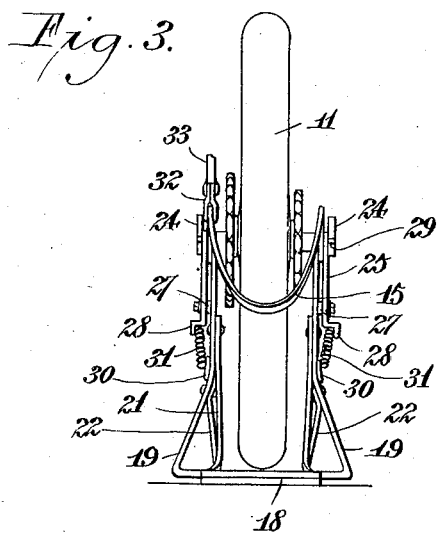
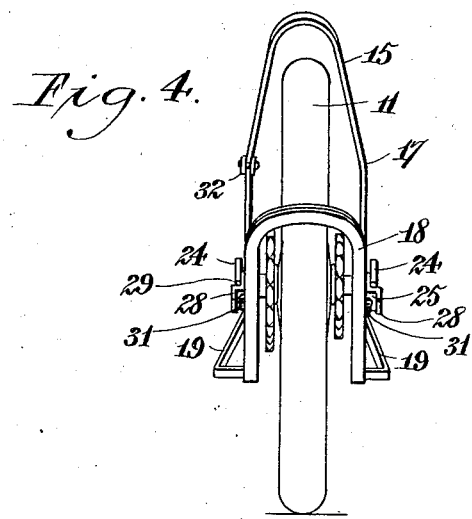
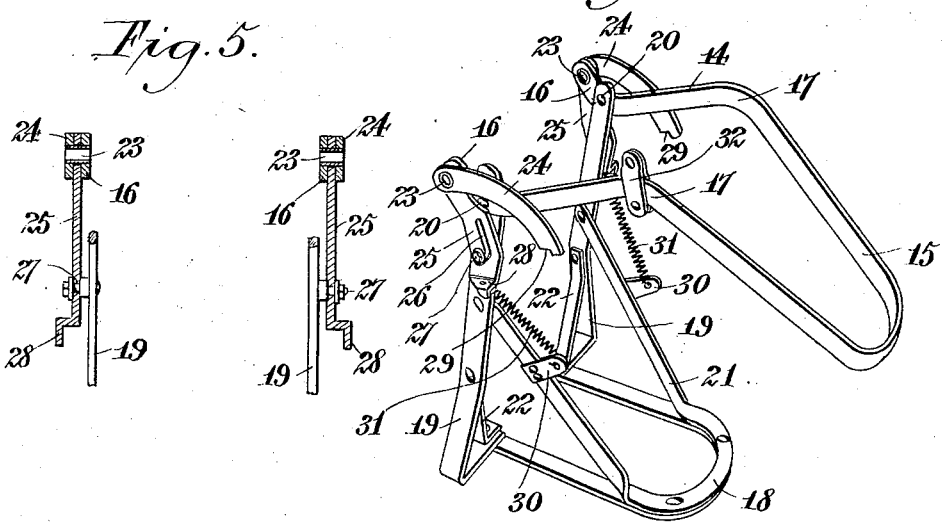
Inventor,
Athol E. Blair.
John W. Blair.
By Victor J. Evans,
Attorney.
Witnesses:
Christ Heinle, Jr.

UNITED STATES PATENT OFFICE.

ATHOL E. BLAIR AND JOHN W. BLAIR, OF VISALIA, CALIFORNIA.

VEHICLE-SUPPORT.

1,068,964.  Specification of Letters Patent.  Patented July 29, 1913.

Application filed November 1, 1912. Serial No. 729,138.

*To all whom it may concern:*

Be it known that we, ATHOL E. BLAIR and JOHN W. BLAIR, citizens of the United States, residing at Visalia, in the county of Tulare and State of California, have invented new and useful Improvements in Vehicle-Supports, of which the following is a specification.

The invention relates to a vehicle support and more particularly to improvements in vehicle supports forming the subject matter of U. S. application filed by me on or about March 22nd, 1912, bearing Serial Number 685,408, and allowed June 18th, 1912.

The primary object of the invention is the provision of a vehicle support of this character which is particularly adapted for use in connection with motorcycles, and in which the initial movement of the device to non-supporting position will effect the forward movement of the motorcycle for giving momentum thereto prior to the contact of the driving wheel with the ground surface and thereby avoid sudden shock to the engine which would necessarily result in the choking or stopping of the engine.

Another object of the invention is the provision of a vehicle support of this character wherein the engine of a motorcycle can be conveniently supported without necessitating the operator pushing or pedaling the motorcycle for a predetermined distance in order to properly start the engine, the driving wheel of the said motorcycle being held slightly elevated from or out of contact with the ground to permit the starting of the engine without the necessity of the driver lifting his seat, yet on the lowering of the driving wheel on to the ground the motorcycle will have been initially started so as to avoid sudden and undue shock to the engine by running, thereby enabling the motor-cycle to be operated in the usual manner directly from the point of rest thereof.

Figure 1:
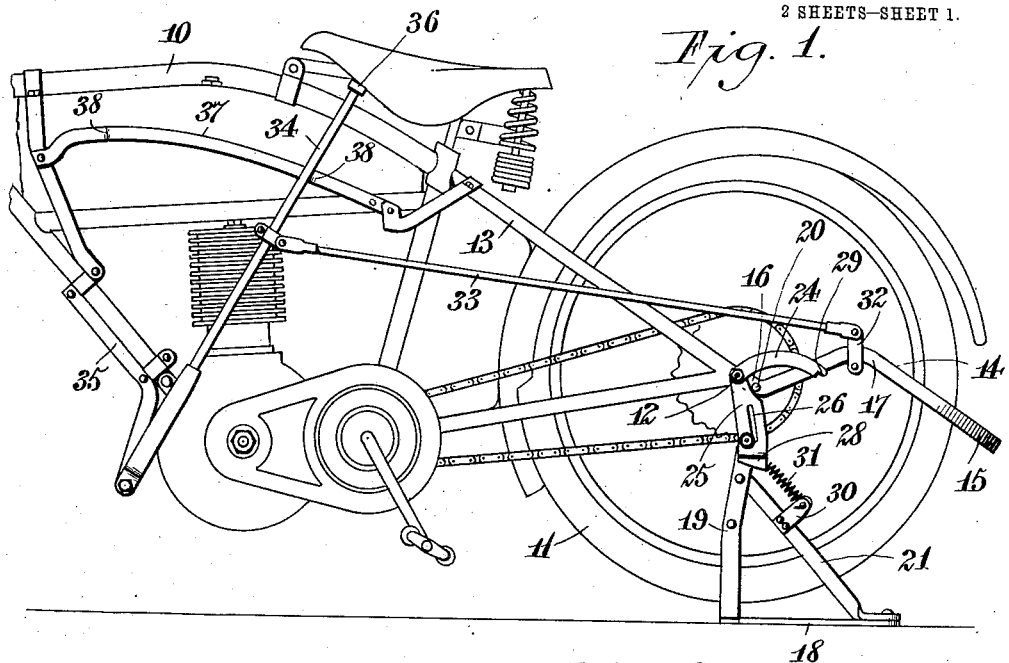
Figure 2:
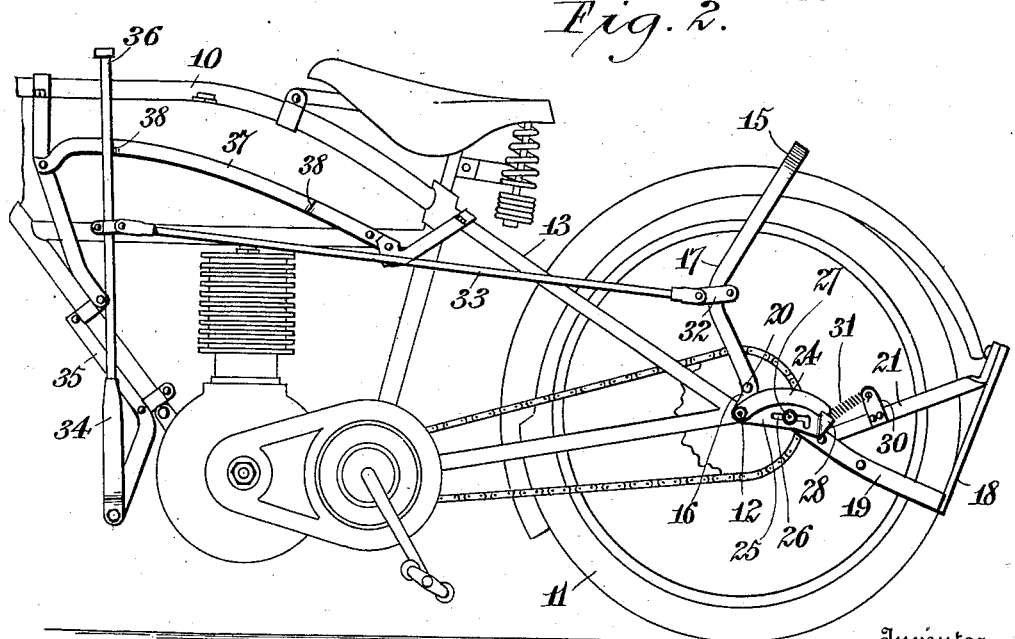

In the further disclosure of the invention reference is to be had to the accompanying drawings constituting a part of this specification and in which similar characters of reference denote corresponding parts in all of the views and in which:

Figure 1 is a side elevation of a vehicle provided with the device constructed in accordance with the invention, the device being shown in supporting position. Fig. 2 is a similar view showing the device in non-supporting position. Fig. 3 is a rear elevation with the device in the position as shown in Fig. 1. Fig. 4 is a similar view with the device in the position shown in Fig. 2. Fig. 5 is a fragmentary vertical sectional view through the device. Fig. 6 is a perspective view of the device detached from the motorcycle.

Referring more particularly to the drawings there is shown a vehicle 10 provided with a rear driving wheel 11, said driving wheel being journaled upon an axle 12 mounted on the rear part of the frame 13 of the vehicle which rear part is known as the rear fork thereof, the vehicle in this instance being a motorcycle of the usual type.

Swingingly connected to the ends of the axle 12 is a frame 14, which comprises more particularly a bar 15 bent into substantially U-shaped form and terminating at the end in off-set ears 16, which are journaled upon the said axle 12, while the limbs of the frame at intermediate points are bent at 17 so as to angularly dispose the closed end of the frame with respect to the remaining portion thereof, the wheel 11 being introduced between the limbs of the frame. Carried by and swingingly connected to the frame 14 is a supporting member comprising a U-shaped base 18 which is adapted to contact and rest upon the ground surface, and fixed to the ends of the said base are laterally extending upwardly converging supporting limbs or uprights 19, the free ends of which are connected to the frame 14 by means of pivots 20, while fixed to the limbs or uprights 19 are the ends of a U-shaped brace 21, the same being also fixed to the closed end of the U-shaped base 18, and thereby assures rigidity to the supporting member. The lower laterally extending portions of the uprights or limbs 19 are reinforced by means of brace strips 22 which are fixed thereto as shown.

The offset ears 16 of the frame 14 have fixed therein sleeves 23, which loosely surround or are journaled on the ends of the axle 12, while secured to the sleeves spaced from and outside of the frame 14 are upwardly arched trip arms 24, while loosely engaged upon the sleeves 23 between the latter and the frame 14 are brace levers 25, each being formed with L-shaped slot 26, and in these slots slidably engage guide lugs 27, the same being fixed in the uprights 19 so that on the lowering of the supporting member when swinging the frame 14 in one direction, the said supporting member will be braced and locked in supporting position. The free ends of the brace lever 25 are outturned to form lips 28 which are adapted to engage in notches 29 formed in the free ends of the trip arms 24, whereby the said lugs will be disengaged from the short lengths or short angular portions of the slots 26, whereby on moving the frame 14 in a forward direction the said lugs will travel in the remaining portions of the slots 26 for bringing and sustaining the supporting member in non-supporting position.

Fixed to the brace frame 21 are slightly out-turned ears 30 to which are engaged the ends of coiled retractile springs 31, the latter also having their remaining ends connected to the lips 28 of the brace levers 25 so that when the supporting member is brought to supporting position the springs will act upon the brace levers 25, so as to move the same in a direction whereby the lugs 27 will engage in the short lengths or off-set portions of the slots 26, thereby locking and sustaining the supporting member in supporting position. Adjustably fixed upon the frame 14 is a clip 32 to which is pivotally connected one end of a throw rod 33, the same being extended forwardly and is pivotally connected with an operating lever 34 mounted to swing on a bracket 35 secured to the frame 13 of the vehicle 10, the upper end of the lever 34 being arranged to lie in convenient reach of the operator or rider of the motorcycle, and terminates in a handle 36.

The lever 34 is designed to traverse a guide plate 37 which is secured to the frame of the vehicle, and is formed with suitable notches 38 for receiving the said lever 34 for retaining it in its adjusted or thrown position, and thereby obviate the accidental swinging of the same.

Assuming that the device is in non-supporting position as shown in Fig. 2 when it is desired to move the same into supporting position the lever 34 is grasped by the operator and by exerting a rearward pull thereon the operating lever will swing rearwardly and through the medium of the rod 34 the frame 14 will swing downwardly thus moving the supporting member into supporting position to raise the rear driving wheel 11 of the motorcycle a distance above the ground. The operator can now start the engine of the vehicle, and when sufficient momentum has been imparted to the driving wheel the operator thrusts the lever 34 in a forward direction which initially moves the motorcycle forwardly and at the same time the frame 14 is raised thereby lifting the supporting member and swinging it rearwardly and upwardly thus bringing the driving wheel in contact with the ground subsequent to the initial forward movement of the motorcycle so that the latter can be started from its point of rest without sudden shock to its engine so that the choking of the latter is avoided.

From the foregoing description taken in connection with the accompanying drawings, it is thought that the construction and operation of the invention will be clearly understood, and therefore, a more extended explanation has been omitted.

What is claimed is:—

1. In a vehicle support, the combination with a frame mounted to swing on the vehicle, of a supporting member mounted upon the frame to swing therewith, means for locking the supporting member in supporting position, means connected with the frame for swinging the same, and trip means acting on the said locking means to release the same from engagement with the supporting member on the partial raising of the said supporting member.

2. In a vehicle support, the combination with a frame mounted to swing on the vehicle, of a supporting member mounted upon the frame to swing therewith, means for locking the supporting member in supporting position, means connected with the frame for swinging the same, trip means acting on the said locking means to release the same from engagement with the supporting member on the partial raising of the said supporting member, and means acting on the said locking means to automatically shift the same into locking position when the supporting member is lowered.

In testimony whereof we affix our signatures in presence of two witnesses.

ATHOL E. BLAIR.
JOHN W. BLAIR.

Witnesses:
E. D. SUTTON,
D. S. LIPSCOMB.

Copies of this patent may be obtained for five cents each, by addressing the "Commissioner of Patents, Washington, D. C."